US012658663B2

(12) United States Patent
Salehiomran et al.

(10) Patent No.: US 12,658,663 B2
(45) Date of Patent: Jun. 16, 2026

(54) SYSTEM FOR FORMING A CONFIGURABLE OPTICAL AMPLIFIER

(71) Applicant: HUAWEI TECHNOLOGIES CO., LTD., Shenzhen (CN)

(72) Inventors: Ali Salehiomran, Gatineau (CA); Zhiping Jiang, Kanata (CA); Lixian Wang, Quebec (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 523 days.

(21) Appl. No.: 18/354,851

(22) Filed: Jul. 19, 2023

(65) Prior Publication Data

US 2025/0030216 A1      Jan. 23, 2025

(51) Int. Cl.
  *H01S 3/10*          (2006.01)
  *H01S 3/067*        (2006.01)
  *H04B 10/67*        (2013.01)
(52) U.S. Cl.
  CPC ...... *H01S 3/10015* (2013.01); *H01S 3/06754* (2013.01); *H04B 10/674* (2013.01)
(58) Field of Classification Search
  CPC ............... H01S 3/0064; H01S 3/10015; H01S 3/06754; H01S 3/09415; H04B 10/674
  See application file for complete search history.

(56) References Cited

U.S. PATENT DOCUMENTS

| | | | |
|---|---|---|---|
| 10,211,592 B1 | 2/2019 | Villeneuve et al. | |
| 10,923,875 B2 | 2/2021 | Zheng et al. | |
| 11,811,459 B1 * | 11/2023 | Pei ..................... | H04B 10/0731 |
| 2020/0099193 A1 * | 3/2020 | Akasaka ............ | H04B 10/2513 |
| 2024/0305368 A1 * | 9/2024 | Chedore ............. | H01S 3/06754 |

* cited by examiner

*Primary Examiner* — Dennis P Joseph
(74) *Attorney, Agent, or Firm* — BCF LLP

(57) ABSTRACT

A configurable optical amplifier platform for forming a configurable optical amplifier and including an input module that receives one or more optical signals and a mounting structure operatively connected to the input module is disclosed. The mounting structure has defined therein a plurality of component compartments arranged in a plurality of series that receive a same type of free-space optical components in compartments of a given series. A first series receives optical isolators, a second series receives optical filters and a third series receives optical attenuators. The configurable optical amplifier platform also includes an active module operatively connected to the mounting structure and receiving signal outputs from the mounting structure and providing optical amplification thereto.

20 Claims, 6 Drawing Sheets

SYSTEM FOR FORMING A CONFIGURABLE OPTICAL AMPLIFIER

CROSS-REFERENCE TO RELATED APPLICATIONS

This is the first application filed for the instantly disclosed technology.

FIELD OF THE TECHNOLOGY

The present disclosure generally relates to the field of optical communication networks and, in particular, to systems for forming a configurable optical amplifier.

BACKGROUND

Bandwidth required for optical backbone networks is doubling every 2 to 3 years. However, transmission side technologies such as Wavelength Division Multiplexing (WDM) and coherent Digital Signal Processing (DSP) are almost saturated and are not expected to be able to grow at this rate. Some technologies rely on adding other bands such as L-band in addition to the conventional C-band but these are not scalable solutions.

In particular, optical amplifiers are a major bottle-neck as their architecture and the components currently used to manufacture them are not suitable for parallelism and integration. However, increasing the number of degrees, i.e. parallel paths, comes with a substantial challenge in price tag, space, and power consumption. Notably, current technologies are not modular, scalable, or programmable. In addition, most of them are not compatible with component arrays that are more and more used in the next generation optical amplifiers.

There is thus an interest in developing a programmable and configurable platform to integrate custom optical amplifiers.

SUMMARY

By way of introduction, an object of the present disclosure (that is, one general purpose of this disclosure) is to provide a configurable optical component receiving platform for forming a configurable optical amplifier that may be implemented in an optical transport network (OTN) link.

In an aspect, the configurable optical component receiving platform aims at providing a shared platform with common parts for forming any optical amplifier. In other words, the configurable optical component receiving platform may be used as a shared platform on top of which a user or an operator may implement components to form an optical amplifier fulfilling custom requirements. Therefore, there is no need for the user or operator to redesign the configurable optical component receiving platform (e.g. mechanically, thermally, or managing fiber routing) to form the configurable optical amplifier. As will be described in greater detail herein after, any type of amplifier ranging from, in non-limiting examples, simple single-coil amplifier to more complicated 4-coil 3-pump 26 dBm amplifier can be implemented within the proposed configurable optical-component receiving platform by simply populating or de-populating components thereof.

According to a first broad aspect of the present technology, there is provided a configurable optical amplifier platform for forming a configurable optical amplifier for one or more optical signals. The configurable optical amplifier platform includes an input module configured to receive the one or more optical signals, a mounting structure operatively connected to the input module and having defined therein a plurality of component compartments, the plurality of component compartments being arranged in a plurality of series arranged and configured to receive a same type of free-space optical component in compartments of a given series, the mounting structure being configured to, in use, dispose the free-space optical components on optical paths of the one or more optical signals. The plurality of series includes at least one of a first series configured to receive optical isolators, a second series configured to receive optical filters, and a third series configured to receive optical attenuators. The component compartments of a same series of component compartments are aligned with one another, thereby forming a column of component compartments, each series of component compartments receiving a plurality of corresponding free-space optical components such that the plurality of series of component compartments defines a plurality of rows of component compartments. Each row of component compartments defining a section of the configurable optical amplifier when filled with corresponding free-space optical components. The configurable optical amplifier platform includes an active module operatively connected to the mounting structure, the active module being configured to receive signal outputs from the optical components in the mounting structure and provide optical amplification thereto, the active module including an output module for outputting the one or more amplified optical signals.

In some non-limiting embodiments, the configurable optical amplifier platform further includes at least one optical waveguide optically connecting a first row of the plurality of rows to a second row of the plurality of rows.

In some non-limiting embodiments, the plurality of series includes at least one series of component compartments configured to receive lenses for routing an optical signal.

In some non-limiting embodiments, the configurable optical amplifier platform further includes a photodiode array operatively connected to the mounting structure.

In some non-limiting embodiments, a signal plane is defined extending along the plurality of component compartments and the photodiode array extends parallel to the signal plane.

In some non-limiting embodiments, the active module comprises an optical pump module comprising at least one optical pump source.

In some non-limiting embodiments, the at least one optical pump source comprises at least one of an uncooled pump source and a multi-mode pump source.

In some non-limiting embodiments, the optical pump module is separate from the mounting structure.

In some non-limiting embodiments, the second series is subsequent to the first series in an optical path of the one or more optical signals, and the third series is subsequent to the second series in the optical path of the one or more optical signals.

In some non-limiting embodiments, the configurable optical amplifier platform further includes a photodiode array operatively connected to the mounting structure.

In some non-limiting embodiments, the plurality of series further includes a fourth series subsequent to the second series and prior to the third series, and a fifth series subsequent to the third series, the fourth and fifth series being configured to receive optical splitters that, in use, direct at least a portion of the optical signal to the photodiode array.

In some non-limiting embodiments, a signal plane is defined extending along the plurality of component compartments and the photodiode array extends parallel to the signal plane.

According to a second broad aspect of the present technology, there is provided a configurable optical amplifier for optical amplification of one or more optical signals. The configurable optical amplifier includes a configurable optical amplifier platform including an input module configured to receive the one or more optical signals, a mounting structure operatively connected to the input module and having defined therein a plurality of component compartments, the plurality of components being arranged in a plurality of series arranged and configured to receive a same type of free-space optical component in compartments of a given series, the mounting structure being configured to, in use, dispose the free-space optical components on optical paths of the one or more optical signals. The plurality of plurality of series including at least one of a first series configured to receive optical isolators, a second series configured to receive optical filters, and a third series configured to receive optical attenuators. The component compartments of a same series of component compartments being aligned with one another, thereby forming a column of component compartments, each series of component compartments receiving a plurality of corresponding free-space optical components such that the plurality of series of component compartments defines a plurality of rows of component compartments. The configurable optical amplifier platform includes an active module operatively connected to the mounting structure, the active module being configured to receive outputs of the plurality of sections of the configurable optical amplifier and provide optical amplification thereto, the active module comprising an output module for outputting the one or more amplified optical signals. The configurable optical amplifier includes a plurality of free-space optical components including at least one optical isolator configured to be disposed in the first series of component compartments, at least one optical filter configured to be disposed in the second series of component compartments, and at least one optical attenuator configured to be disposed in the third series of component compartments.

In some non-limiting embodiments, the second series is subsequent to the first series in an optical path of the one or more optical signals, and the third series is subsequent to the second series in the optical path of the one or more optical signals.

In some non-limiting embodiments, the configurable optical amplifier further includes a photodiode array operatively connected to the mounting structure and a controller communicably connected to the photodiode array and configured to receive information about the processed optical signal therefrom.

In some non-limiting embodiments, the plurality of series further includes a fourth series subsequent to the second series and prior to the third series, and a fifth series subsequent to the third series, the fourth and fifth series receiving optical splitters that, in use, direct at least a portion of the optical signal to the photodiode array.

In some non-limiting embodiments, the configurable optical amplifier further includes at least one optical waveguide operably connected to the mounting structure, a first amplification stage defined by a combination of a first row with corresponding optical components and the active module, a second amplification stage defined by a combination of a second row with corresponding optical components and the active module, the at least one optical waveguide optically connecting the first amplification stage to the second amplification stage.

In some non-limiting embodiments, the configurable optical amplifier further includes a first amplification stage defined by a combination of a first row with corresponding optical components and the active module, and a second amplification stage defined by a combination of a second row with corresponding optical components and the active module. The one or more optical signals includes a first optical signal and a second optical signal. The first optical signal is carried by a first optical link to the input module, the second optical signal is carried by a second optical link to the input module, and the input module directs the first optical signal to the first amplification stage, and directs the second optical signal to the second amplification stage such that the output module outputs a first and a second amplified optical signal respectively from the first and second optical signals in an independent manner.

In some non-limiting embodiments, the plurality of series further comprises at least one series configured to receive lenses for routing an optical signal.

In some non-limiting embodiments, a signal plane is defined extending along the plurality of component compartments and the photodiode array extends parallel to the signal plane.

In some non-limiting embodiments, the active module comprises an optical pump module comprising at least one optical pump source.

In some non-limiting embodiments, the at least one optical pump source comprises at least one of an uncooled pump source and a multi-mode pump source.

In some non-limiting embodiments, the optical pump module is separate from the mounting structure.

In some non-limiting embodiments, at least one of the plurality of free-space optical components includes an array of a corresponding free-space optical component.

In some non-limiting embodiments, each of the plurality of free-space optical components has a specular reflection below a pre-determined threshold.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments or implementations and is not intended to be limiting of the present technology. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

Moreover, all statements herein reciting principles, aspects, embodiments, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some implementations or implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

BRIEF DESCRIPTION OF THE FIGURES

The features and advantages of the present disclosure will become apparent from the following detailed description, taken in combination with the appended drawings, in which.

Figure 1:
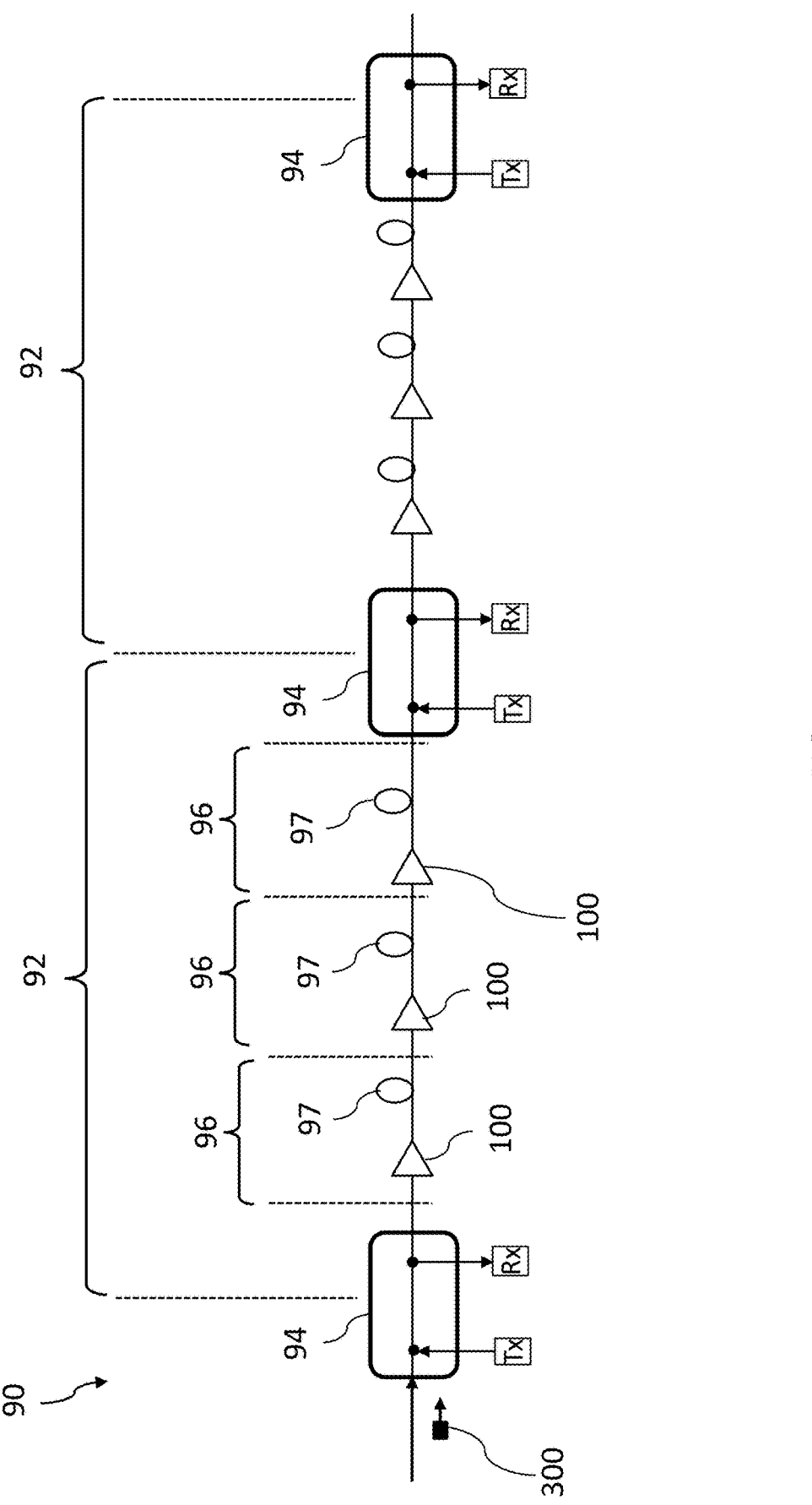
FIG. 1 is a block diagram of an optical transport network (OTN) link.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments and implementations of the described technology will be described more fully hereinafter with reference to the accompanying drawings, in which representative embodiments and implementations are shown. The present technology concept may, however, be embodied in many different forms and should not be construed as limited to the representative embodiments and implementations set forth herein. Rather, these representative embodiments and implementations are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

Referring now to the drawings, FIG. 1 depicts a conceptual diagram of an optical transport network (OTN) link 90 that may be addressed by the systems presented herein. As shown, the OTN link 90 typically includes a plurality of optical multiplexing sections (OMSs) 92 for transmitting an optical signal 300. The OTN link 90 may include a conventional optical fiber such as, for example, a glass fiber surrounded by one or more coating layers. The OTN link 90 may include an optical fiber core which transmits the optical signal 300, and an optical cladding, which confines the optical signal within the optical fiber core. It is also contemplated that light defining the optical signal 300, may be single polarized, dual polarized, randomly polarized, or may have a particular polarization (e.g. linearly polarized, elliptically polarized, or circularly polarized). In this implementation, a wavelength of the optical signal 300 can be located in one or multiple of the following bands: E-band (1400~1470 nm), S-band (1470~1520 nm), C-band (1520~1565 nm), L-band (1565~1630 nm), and U-band (1630 nm~1680 nm) bands.

Each OMS 92 includes optical add-drop multiplexers, such as, for example, a reconfigurable optical add-drop multiplexers (ROADMs) 94 each containing at least one wavelength selective switch (not shown). The OADMs 94 may include transmitters, denoted "Tx", and receivers, denoted "Rx", to respectively add and drop a given signal from the optical signal 300. Each OMS 92 may then be configured to add, remove, and/or reroute a wavelength of the optical signal 300, via the OADMs 94. For example and without limitation, each transmitter Tx may be a laser source of a respective wavelength and communicatively connected to a corresponding processing unit (not shown) of the OADM 94. The laser source may be configured to produce, emit, or radiate pulses of light with certain pulse duration. In certain implementations, one or more transmitters Tx implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The OADM 94 may be a passive multiplexer such as, without limitation, a prism-based or a mirror-based multiplexer, or an active multiplexer based on a combination of passive components and tunable detectors, each detector being tuned to a specific frequency. Each OMS 92 is formed from multiple optical transport sections (OTSs) 96, where at each OTS 96 the wavelength remains same.

It is noted that the OTN link 90 may incorporate additional optical elements, which may include either or both of active and passive elements/modules, including but not limited to: optical amplifiers, optical filters, wavelength selective switches, arrayed waveguide gratings, optical transmitters, optical receivers, processors and other suitable components. However, for purposes of simplicity, these elements have been omitted from FIG. 1.

Each optical transport section 96, also referred to as a link 96, includes an optical amplifier (e.g., erbium-doped fiber amplifiers (EDFAs)) and a length of fiber 97. The optical fiber may be of any suitable type such as, for example, single mode optical fiber, multi-mode optical fiber, standard single mode fibers (SSMFs), large effective area fibers (LEAFs) or the like. The optical amplifier of the link 96 could include various amplifiers placed in a sequence for amplifying the optical signal along the OTN link 105. According to non-limiting implementations of the present technology, the amplifier of at least one of the OTSs 96 is a configurable optical amplifier 100.

Figure 2:
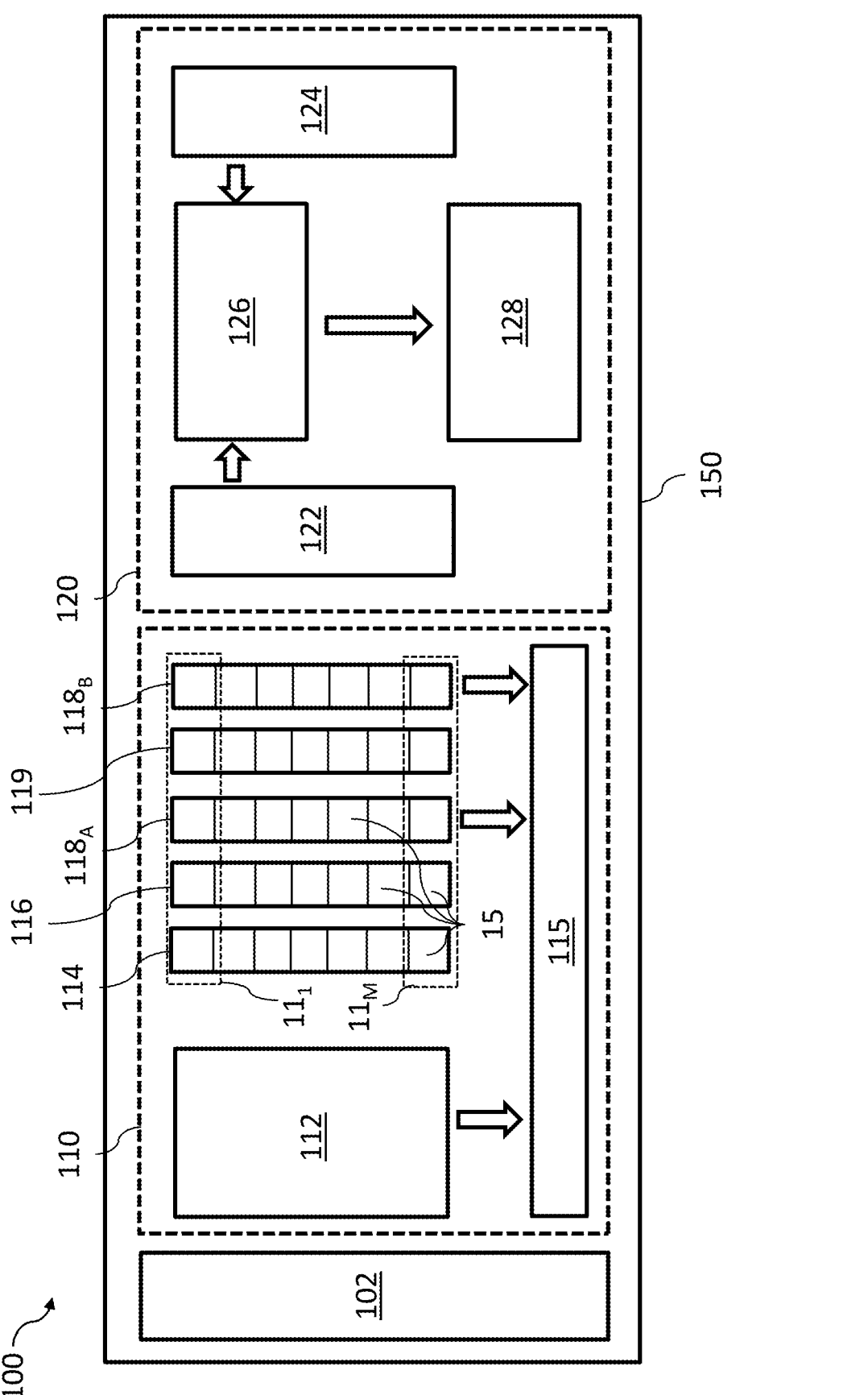
FIG. 2 is a block diagram of a configurable optical amplifier of the OTN link of FIG. 1, in accordance with some implementations of the present technology.
Figure 3:
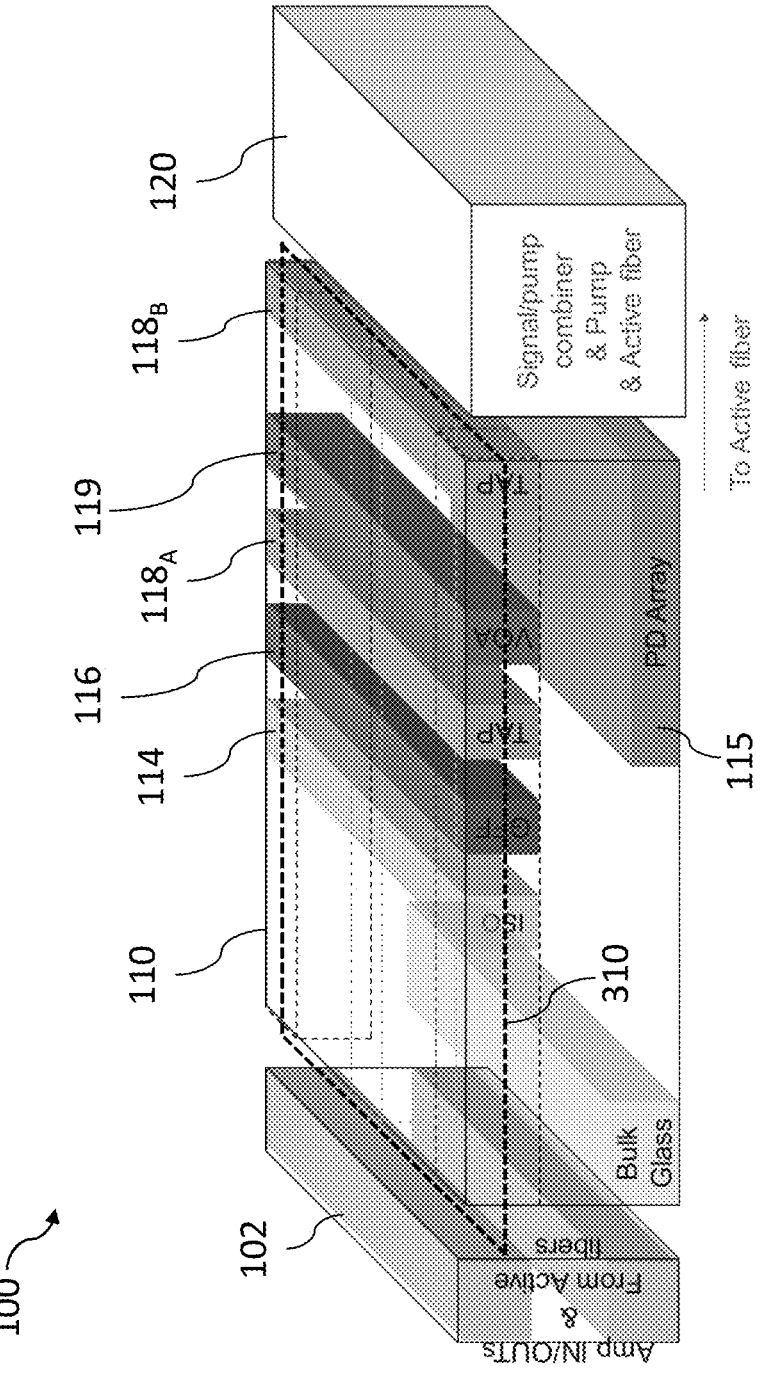
FIG. 3 is a high-level diagram of the configurable optical amplifier of FIG. 2.

With reference to FIGS. 2 and 3, the configurable optical amplifier 100 in accordance with non-limiting implementations of the present technology is illustrated in more detail. While only one configurable optical amplifier 100 is described herein, it is contemplated that any number of the OTSs 96 of the network 90 could include the configurable optical amplifier 100.

In this implementation, the configurable optical amplifier 100 includes a configurable optical amplifier platform 150 that may receive a plurality of optical components to provides functionalities of the configurable optical amplifier 100. By the present technology, the configurable optical amplifier platform 150 provides an adaptable solution for incorporation of one or many amplifying components in a same base structure and support components (such as pumps, etc.) while reducing design complexity compared to incorporating full amplifier structures one-by-one.

The configurable optical amplifier platform 150 includes an input module 102 for receiving an optical signal such as the optical signal 300 from one or more fibers such as a fiber 97. In some implementations, the input module 102 may receive optical signals from a multi-core fiber. For example, the fiber 97 may be a multi-core fiber. The input module 102 may include, for example and without limitations, waveguides and custom filtering components. In cases where the fiber 97 is a multi-core fiber, the input module 102 includes a fan-out device to connect each core of the multi-core fiber to a single core fiber.

Broadly speaking and as will be described in greater details herein after, an amplification stage of the configurable optical amplifier 100 may be used to amplify every wavelength channels in the incoming fiber 97. In cases where the configurable optical amplifier 100 is a multi-band system (e.g. C+L band), the input module 102 may separate the incoming optical signal into C band and L band, and amplify the separated signals independently from one another. For example, the input module 102 may direct the received optical signal, or a portion thereof, to one or more specific row $11_i$ of component compartments 15, as it will be described in greater details herein after. A coupling mechanism between the input module 102 and the one or more fibers may be adapted to a type thereof (e.g. single-core or multi-core).

Passive Module

The configurable optical amplifier platform 150 further includes a mounting structure 110 operatively connected to the input module 102. In use, the mounting structure 110 is configured and arranged to receive optical components for forming one or more custom amplifiers. More specifically, the mounting structure 110 defines therein a plurality of component compartments 15 arranged in a plurality of series 114, 116, $118_A$, 119 and $118_B$. The component compartments 15 may be, for example and without limitation, recesses or mounts defined in the mounting structure 110 and/or mounts connected therewith.

In some implementations, the component compartments 15 of a given series receive a same type of optical component. For example and without limitations, in the illustrative implementation of FIGS. 2 and 3, the mounting structure 110 defines a first series of compartments 114 that receives optical isolators and a second series of compartments 116, subsequent to the first series 114 in an optical path of the one or more optical signals, that receives optical filters. There is further a third series of compartments $118_A$, subsequent to the second series 116 in the optical path, that receives optical splitters, a fourth series of compartments 119, subsequent to the third series $118_A$ in the optical path, that receives optical attenuators, and a fifth series of compartments $118_B$, subsequent to the fourth series 119 in the optical path, that receives optical splitters. In some implementations, the mounting structure 110 further defines at least one series of component compartments 15 that may receive lenses for routing optical signals.

In some implementations, the optical components of the mounting structure 110 (e.g. optical isolators, optical filters optical splitters and optical attenuators) are free-space based optical components. This may help in minimizing a packaging and/or fabrication cost of the configurable optical amplifier 100. In the same or other implementations, the components of a same series of components are assembled as a component array. In other words, at least one series of component compartments of the configurable optical amplifier 100 hosts an array of a corresponding free-space optical component. For example, an optical isolator array could be disposed in series 114 or a portion thereof. As such, at least a portion of the component compartments 15 are filled with said array of free-space optical components. This may reduce a cost of the configurable optical amplifier 100 and increase a scalability thereof.

As shown on FIG. 2, the component compartments of a same series of component compartment 15 are aligned with one another in a direction generally orthogonal to the optical axes of the optical components, thereby forming a column of component compartments 15. In addition, the component compartments 15 are aligned so that the plurality of series of component compartments 15 defines a plurality of rows 11; of component compartments 15. In the context of the present disclosure, each row 11; of component compartments 15 defines a "section" of the configurable optical amplifier 100 when filled with corresponding optical components. Each section shares a corresponding optical axis therethrough such that an optical signal may traverse a section of the configurable optical amplifier 100 by successively traversing the optical components of the section. In other words, each section of the configurable optical amplifier 100 has, in use, its own optical axis such that the configurable optical amplifier 100 may process different optical signals in parallel with different sections thereof.

In at least some implementations and as best shown on FIG. 2, the mounting structure 110 includes a filtering module 112 that receives optical signals from the input module 102 and direct the optical signals to one or more of the sections of the configurable optical amplifier 100. In use, the filtering module 112 may include components for pre-processing the optical signals. In use, the filtering module 112 may separate and/or combine optical signals (e.g. having different wavelengths and/or belonging to different optical bands). For example and without limitation, the filtering module 112 may be used to filter and/or separate different bands (e.g. C and L bands) in the optical signal 300.

The mounting structure 110 may also include a photodiode array 115 operatively connected thereto. As best shown on FIG. 3, a signal plane 310 is defined extending along the plurality of component compartments 15 and including the optical axes of the sections of the configurable optical amplifier 100. In use, the photodiode array 115 extends parallel to the signal plane 310 and receives signals from optical components in the component compartments 15. For example, a controller, such as the controller 600 (see FIG. 6), may be communicably connected to the photodiode array 115 and receive data therefrom about optical signals propagating in the configurable optical amplifier 100 for, for example, monitoring an amplification of the optical signal 300. In use, the photodiode array 115 may be used to monitor optical power of the optical signals processed by the configurable optical amplifier 100. More specifically, the photodiode array 115 may receive signals from the filtering module 112 and/or the optical splitters mounted in the third and fifth series of component compartments. In use, the optical splitters direct at least a portion of the optical signal to the photodiode array 115. In this implementation, the photodiode array 115 is located below the signal plane 310. It should be noted that, in some embodiments, the photodiode array 115 and the optical splitters of the third and fifth series of compartments 118$_A$, 118$_B$ may be omitted. As such, there may be only three series of component compartments in these embodiments, namely one for optical isolators, one for optical filters and one for optical attenuators.

Figure 4:
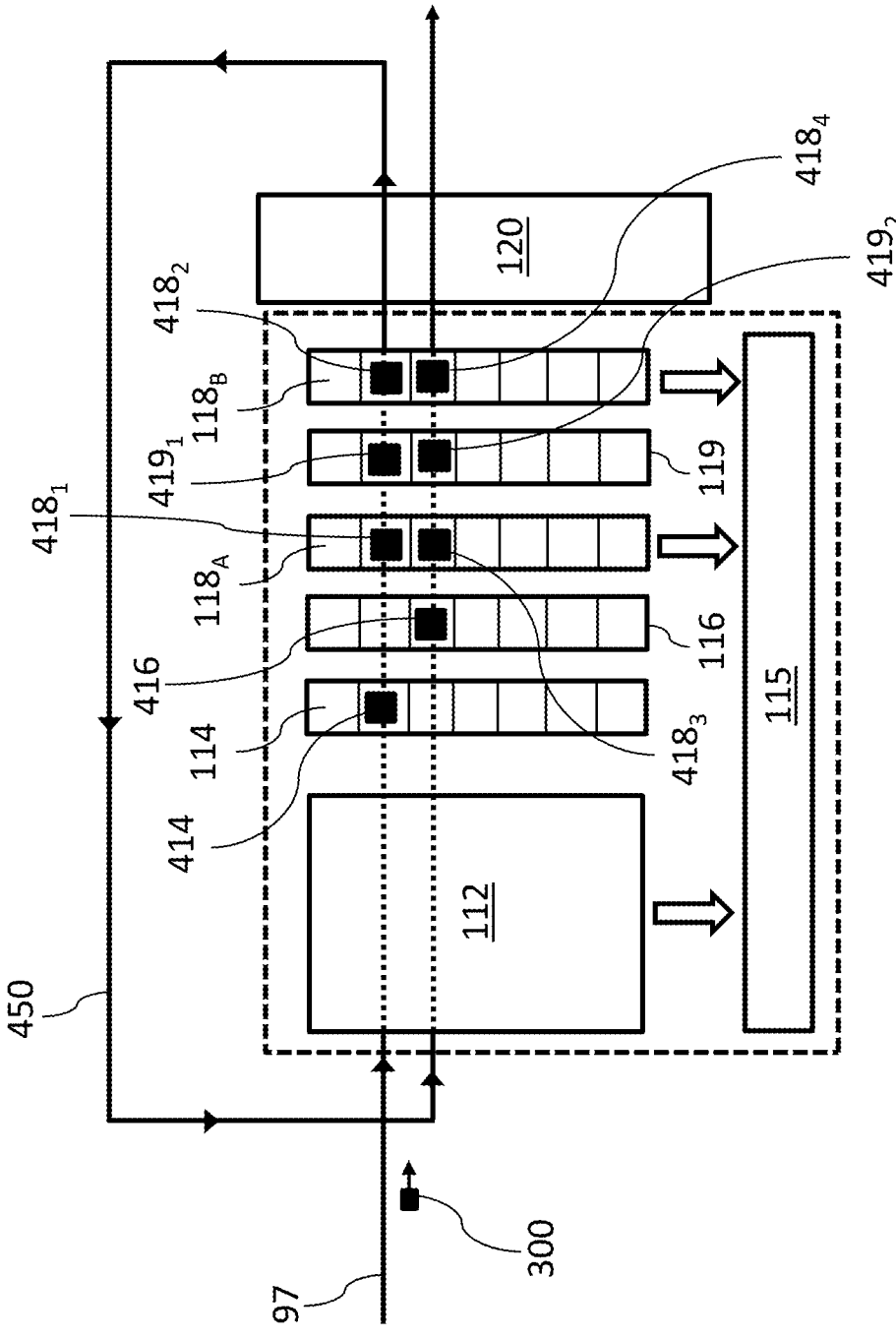
FIG. 4 is a block diagram of the configurable optical amplifier of FIG. 2 with multiple amplification stages in accordance with some implementations of the present technology.

Broadly speaking, an operator of the configurable optical amplifier 100 populates the mounting structure 110, more specifically the component compartments 15, with optical components according to custom and personalized specifications to form the configurable optical amplifier 100. For example, FIG. 4 illustrates the configurable optical amplifier 100 formed by populating the mounting structure 110 with an optical isolator 414, a first optical splitter 4181, a first optical attenuator 4191 (e.g. a Variable Optical Attenuator), a second optical splitter 4182 in a first row 112 of the component compartments 15, and an optical filter 416 (e.g. a gain flattening filter), a third optical splitter 4183, a second optical attenuator 4192 and a fourth optical splitter 4184 in a second row 113 of the component compartments 15.

In some implementations, optical components mounted on the mounting structure 110 are passive optical components. The mounting structure 110 filled with at least one optical component in at least one corresponding component compartment may thus be referred to as a "passive module".

Active Module

The configurable optical amplifier platform 150 further includes an active module 120 operatively connected to the mounting structure 110 and including active optical components. Broadly speaking, the active module 120 receives, in use, outputs of the plurality of sections of the configurable optical amplifier 100 and provides optical amplification thereto, the active module comprising an output module 128 for outputting the one or more amplified optical signals. In this implementation, the active module 120 includes an input module 122 for receiving optical signals output by the optical components mounted on the mounting structure 110. For example, the input module 122 may include an optical input for each of the sections of the configurable optical amplifier 100 such that the input module 122 may receive optical signals from the sections independently from one another. The active module 120 also includes an optical pump module 124 including optical pump sources, a signal combiner 126 and an output module 128.

In use, the optical signal is combined, in the active module 120, with a signal generated by the pump sources, or "optical pump signal," by the signal combiner 126 and further injected into the output module 128. In other words, the optical signal and the pump signal are multiplexed by the signal combiner 126 into the output module 128 that may conduct the combined signals through doped fibers, such as erbium doped fibers, optically connected thereto before being transmitted to fibers of the OTN link 90. As such, the optical signal is amplified through interaction with the doping ions, thereby generating an amplified signal. The pump sources of the optical pump module 124 may be, for example and without limitations, single-mode semiconductor laser diodes whose wavelengths are located in the vicinity of 980 nm. As a person skilled in the art would understand, amplification is achieved by stimulated emission of photons from dopant ions in the doped fibers.

In this implementation, physically distancing the active components (e.g. the active optical pumps thereof) from the optical components of the mounting structure 110 by defining the active module 120 and the mounting structure 110 of the configurable optical amplifier platform 150 may minimize a scattering effect within the configurable optical amplifier 100 and reduce cross-talk between optical pump sources and optical signal paths in the optical components mounted on the mounting structure 110. For example, in some embodiments, each of the plurality of optical components of the mounting structure 110 has a specular reflection below a pre-determined threshold to further improve the reduction of said cross-talk. The optical pump source may include at least one of an uncooled pump source and a multi-mode pump source. In some embodiments, the optical pump sources are uncooled to increase a wall-plug efficiency thereof. Use of uncooled pump sources is made possible, at least in part, by the present technology by packaging the uncooled pump sources all together in the pump module 124, which is separate from the passive module portion.

In the context of the present disclosure, an amplification stage of the configurable optical amplifier 100 is defined by a combination of a corresponding row of the mounting structure 110, filled with at least one optical component, and the active module 120. In other words, an amplification stage of the configurable optical amplifier 100 corresponds to a given row $11_i$ having its component compartments 15 filled with at least one optical component. Hence, it can be said that an amplification stage may perform functions of a stand-alone optical amplifier. The configurable optical amplifier 100 may thus define a plurality of optical amplifiers in parallel, each optical amplifier being defined by an amplification stage thereof.

More specifically, an optical signal is optically amplified by propagating through optical components mounted on the mounting structure 110 sharing a same optical axis (i.e. being in a same row 11; of component compartments 15) and through optical components of the active module 120. Characteristics of said amplification may be determined based on characteristics of the optical components mounted on the mounting structure 110 and characteristics of the optical components of the active module 120.

In some implementations, the configurable optical amplifier 100 further includes at least one optical waveguide optically connecting a first amplification stage to a second amplification stage of the configurable optical amplifier 100. FIG. 4 is a schematic representation of the configurable optical amplifier 100 providing a multi-stage amplification to the optical signal 300. The input module 102 is not depicted for clarity of FIG. 4. In this implementation, the configurable optical amplifier 100 includes an optical waveguide 450 optically connecting an output of the first row of optical components of the mounting structure 110 to an input of the second row thereof.

More specifically, the optical signal 300 propagates through a first amplification stage of the configurable optical amplifier 100 including, ordered in a direction of an optical path of the optical signal 300, the optical isolator 414, the first optical splitter 4181, the first optical attenuator 4191, the second optical splitter 4182, and the active module 120, before being directed to a second amplification stage of the configurable optical amplifier 100. In this example, the second amplification stage includes, ordered in a direction of an optical path of the optical signal 300, the optical filter 416, the third optical splitter 4183, the second optical attenuator 4192 and the active module 120.

In the illustrative example of FIG. 4, the optical signal 300 is optically amplified a first time by propagating through the first amplification stage, and a second time by propagating through the second amplification stage before outputting from the configurable optical amplifier 100. The optical signal 300 may for example be further directed to a fiber 97 of the OTN link 90.

In some implementations, the configurable optical amplifier 100 may receive a plurality of optical signals. With respect to FIG. 5, the configurable optical amplifier 100 receives the optical signal 300, referred to as a first optical signal 300, and as well as a second optical signal 300'. The first optical signal 300 may be received by the configurable optical amplifier 100 from a first fiber, and the second optical signal 300' may be received by the configurable optical amplifier 100 from a second fiber distinct from the first fiber. The first and second optical signals 300, 300' may thus be independent from each other and carried by two distinct OTN links.

Figure 5:
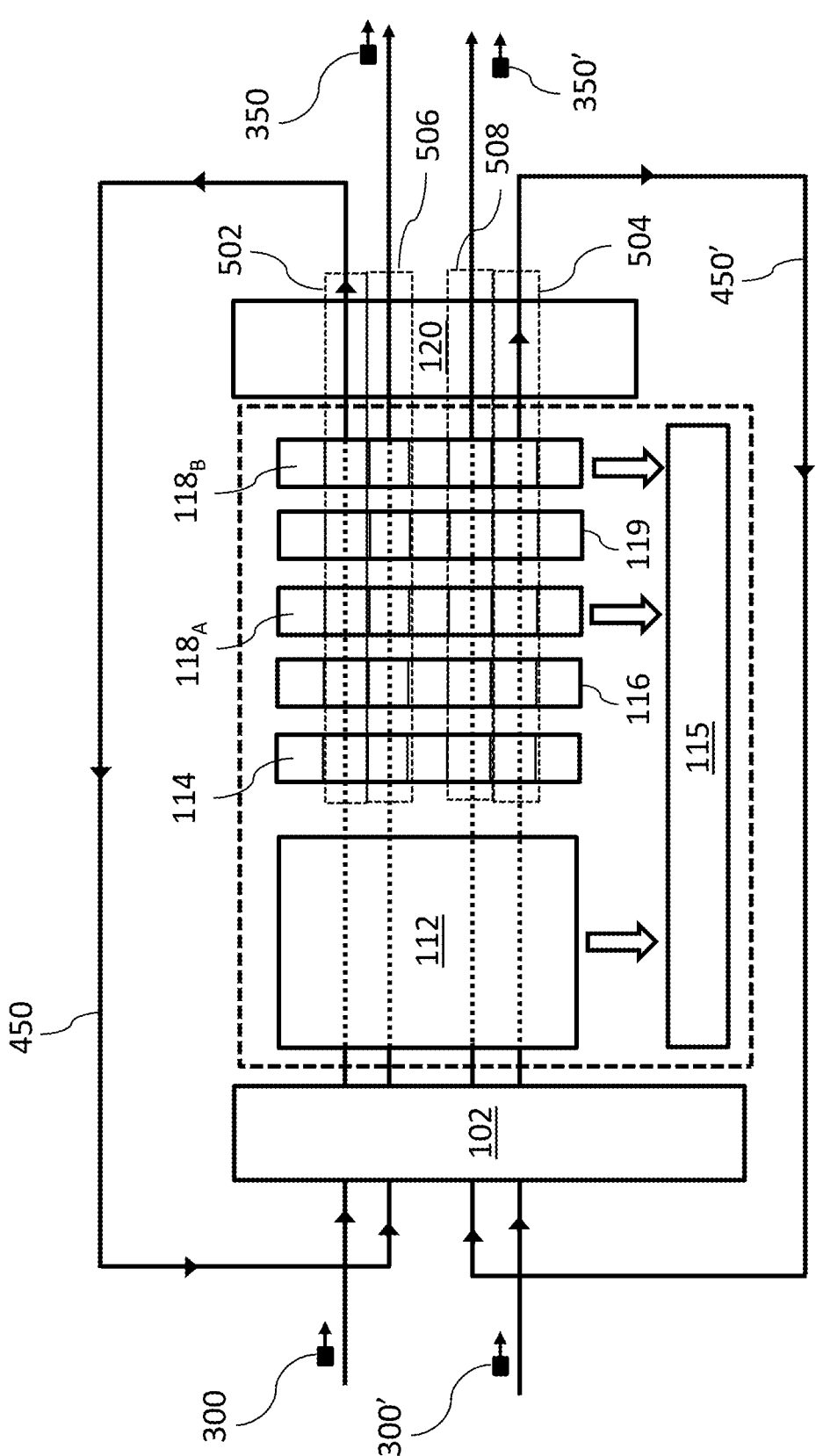
FIG. 5 is a block diagram of the configurable optical amplifier of FIG. 2 with multiple amplification stages and multiple inputs in accordance with some implementations of the present technology.

As shown on FIG. 5, the input module 102 directs the first optical signal 300 to a first amplification stage 502 and directs the second optical signal 300' to a second amplification stage 504 of the configurable optical amplifier 100. The output module 128 of the active module 120 may output a first and a second amplified optical signal respectively from the first and second optical signals in an independent manner. In the illustrative example of FIG. 5, the optical waveguide 450 directs the first optical signal 300 from the active module 120 to a third amplification stage 506 of the configurable optical amplifier 100. Additionally, the configurable optical amplifier 100 includes another optical waveguide 450' that direct the second optical signal 300' from the active module 120 to a fourth amplification stage 508 of the configurable optical amplifier 100. The first and second optical signals 300, 300' are thus optically amplified twice (i.e. with two amplification stages) each, with custom optical components to generate the first and a second amplified optical signals 350, 350' respectively.

Figure 6:
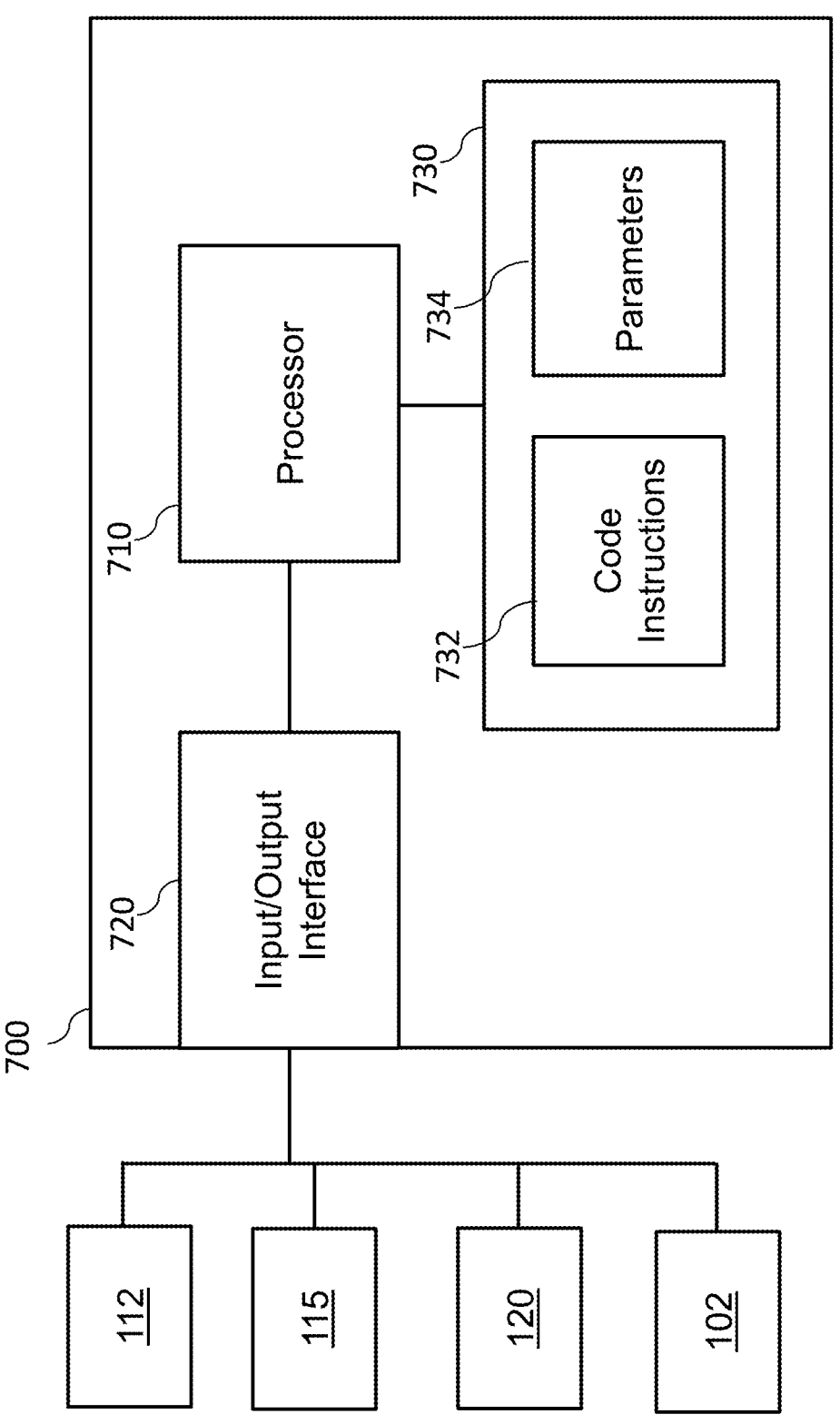
FIG. 6 is a block diagram of a controller of the configurable optical amplifier of FIG. 2 in accordance with some implementations of the present technology.

FIG. 6 schematically illustrates one non-limiting example of a controller 600 of the configurable optical amplifier 100 according to some implementations of the present technology. The controller 600 comprises a processor or a plurality of cooperating processors (represented as a processor 610 for simplicity), a memory device or a plurality of memory devices (represented as a memory device 630 for simplicity), and an input/output interface 620 allowing the controller 600 to communicate with other components of the configurable optical amplifier 100 and/or other components in remote communication with the configurable optical amplifier 100. The processor 610 is operatively connected to the memory device 630 and to the input/output interface 620. The memory device 630 includes a storage for storing parameters 634. The memory device 630 may comprise a non-transitory computer-readable medium for storing code instructions 632 that are executable by the processor 610 to allow the controller 600 to perform the various tasks allocated to the controller 600 such as adjusting direction of the received optical signals to the amplification stages, monitoring the pump sources of the active modules and other relevant task for suitable operation of the configurable optical amplifier 100.

The controller 600 is operatively connected, via the input/output interface 620, to the input module 102, the active module 120 and components thereof, the photodiode array 115 and the filtering module 112. FIG. 6 as illustrated represents a non-limiting implementation in which the controller 600 orchestrates operations of the configurable optical amplifier 100. This particular implementation is not meant to limit the present disclosure and is provided for illustration purposes.

Summarily, the disclosed configurable optical amplifier 100 enables the implementation of various types of optical amplifiers by providing a platform for selectively populating component compartments 15 of the mounting structure 110 in order to create a configurable amplifier. It can be said that the configurable optical amplifier 100 introduces a unified approach to build optical amplifiers. Through removing packaging of each optical component individually, scalability improvement and significant cost reduction may be achieved. In addition, the configurable optical amplifier 100 may host component arrays, thus providing another level of cost reduction. It can be noted that a direction of light (i.e. optical signal) though the optical components of the mounting structure 110 is not changed therealong, which may help in reducing number of lenses, mirrors, or prisms. The design of the configurable optical amplifier 100 simplifies routing and results in less cross talk due to stray light by streamlining light direction.

It is to be understood that the operations and functionality of configurable optical amplifier 100, constituent components, and associated processes may be achieved by any one or more of hardware-based, software-based, and firmware-based elements. Such operational alternatives do not, in any way, limit the scope of the present disclosure.

It will also be understood that, although the implementations presented herein have been described with reference to specific features and structures, it is clear that various modifications and combinations may be made without departing from such disclosures. The specification and drawings are, accordingly, to be regarded simply as an illustration of the discussed implementations or implementations and their principles as defined by the appended claims, and are contemplated to cover any and all modifications, variations, combinations or equivalents that fall within the scope of the present disclosure.

What is claimed is:

1. A configurable optical amplifier platform for forming a configurable optical amplifier for one or more optical signals, the configurable optical amplifier platform comprising:

an input module configured to receive the one or more optical signals;

a mounting structure operatively connected to the input module and having defined therein a plurality of component compartments, the plurality of component compartments being arranged in a plurality of series arranged and configured to receive a same type of free-space optical component in compartments of a given series, the mounting structure being configured to, in use, dispose the free-space optical components on optical paths of the one or more optical signals, the plurality of series comprising at least one of:

a first series configured to receive optical isolators, a second series configured to receive optical filters, and a third series configured to receive optical attenuators, the component compartments of a same series of component compartments being aligned with one another, thereby forming a column of component compartments, each series of component compartments being configured to receive a plurality of corresponding free-space optical components such that the plurality of series of component compartments defines a plurality of rows of component compartments, when filled with corresponding free-space optical components, each row of component compartments defining a section of the configurable optical amplifier; and an active module operatively connected to the mounting structure, the active module being configured to receive signal outputs from the optical components in the mounting structure and provide optical amplification thereto, the active module comprising an output module for outputting the one or more amplified optical signals.

2. The configurable optical amplifier platform of claim 1, further comprising:

at least one optical waveguide optically connecting a first row of the plurality of rows to a second row of the plurality of rows.

3. The configurable optical amplifier platform of claim 1, wherein the plurality of series comprises at least one series of component compartments configured to receive lenses for routing an optical signal.

4. The configurable optical amplifier platform of claim 1, wherein the active module comprises an optical pump module comprising at least one optical pump source.

5. The configurable optical amplifier platform of claim 4, wherein the at least one optical pump source comprises at least one of:

an uncooled pump source; and a multi-mode pump source.

6. The configurable optical amplifier platform of claim 4, wherein the optical pump module is separate from the mounting structure.

7. The configurable optical amplifier platform of claim 1, wherein:

the second series is subsequent to the first series in an optical path of the one or more optical signals, and the third series is subsequent to the second series in the optical path of the one or more optical signals.

8. The configurable optical amplifier platform of claim 7, further comprising a photodiode array operatively connected to the mounting structure.

9. The configurable optical amplifier platform of claim 8, wherein the plurality of series further comprises:

a fourth series subsequent to the second series and prior to the third series, and a fifth series subsequent to the third series, the fourth and fifth series being configured to receive optical splitters that, in use, direct at least a portion of the optical signal to the photodiode array.

10. The configurable optical amplifier platform of claim 8, wherein:

a signal plane is defined extending along the plurality of component compartments; and the photodiode array extends parallel to the signal plane.

11. A configurable optical amplifier for optical amplification of one or more optical signals, the configurable optical amplifier comprising:

a configurable optical amplifier platform comprising:

an input module configured to receive the one or more optical signals;

a mounting structure operatively connected to the input module and having defined therein a plurality of component compartments, the plurality of components being arranged in a plurality of series arranged and configured to receive a same type of free-space optical component in compartments of a given series, the mounting structure being configured to, in use, dispose the free-space optical components on optical paths of the one or more optical signals, the plurality of plurality of series comprising at least one of:

a first series configured to receive optical isolators, a second series configured to receive optical filters, and a third series configured to receive optical attenuators, the component compartments of a same series of component compartments being aligned with one another, thereby forming a column of component compartments, each series of component compartments being configured to receive a plurality of corresponding free-space optical components such that the plurality of series of component compartments defines a plurality of rows of component compartments; and an active module operatively connected to the mounting structure, the active module being configured to receive outputs of the plurality of sections of the configurable optical amplifier and provide optical amplification thereto, the active module comprising an output module for outputting the one or more amplified optical signals;

a plurality of free-space optical components comprising:

at least one optical isolator configured to be disposed in the first series of component compartments;

at least one optical filter configured to be disposed in the second series of component compartments; and at least one optical attenuator configured to be disposed in the third series of component compartments.

12. The configurable optical amplifier of claim 11, wherein:

the second series is subsequent to the first series in an optical path of the one or more optical signals, and the third series is subsequent to the second series in the optical path of the one or more optical signals.

13. The configurable optical amplifier of claim 12, further comprising a photodiode array operatively connected to the mounting structure and a controller communicably connected to the photodiode array and configured to receive information about the processed optical signal therefrom.

14. The configurable optical amplifier of claim 13, wherein the plurality of series further comprises:

a fourth series subsequent to the second series and prior to the third series, and a fifth series subsequent to the third series, the fourth and fifth series being configured to receive optical splitters that, in use, direct at least a portion of the optical signal to the photodiode array.

15. The configurable optical amplifier of claim 13, wherein:

a signal plane is defined extending along the plurality of component compartments; and the photodiode array extends parallel to the signal plane.

16. The configurable optical amplifier of claim 11, further comprising:

at least one optical waveguide operably connected to the mounting structure;

a first amplification stage defined by a combination of a first row with corresponding optical components and the active module;

a second amplification stage defined by a combination of a second row with corresponding optical components and the active module;

wherein the at least one optical waveguide optically connects the first amplification stage to the second amplification stage.

17. The configurable optical amplifier of claim 16, further comprising:

a first amplification stage defined by a combination of a first row with corresponding optical components and the active module;

a second amplification stage defined by a combination of a second row with corresponding optical components and the active module; and wherein:

the one or more optical signal comprises a first optical signal and a second optical signal, the first optical signal is carried by a first optical link to the input module, the second optical signal is carried by a second optical link to the input module, and the input module is configured to:

direct the first optical signal to the first amplification stage, and direct the second optical signal to the second amplification stage such that the output module outputs a first and a second amplified optical signal respectively from the first and second optical signals in an independent manner.

18. The configurable optical amplifier of claim 11, wherein the active module comprises an optical pump module comprising at least one optical pump source.

19. The configurable optical amplifier of claim 18, wherein the at least one optical pump source comprises at least one of:

an uncooled pump source; and a multi-mode pump source.

20. The configurable optical amplifier of claim 18, wherein the optical pump module is separate from the mounting structure.

\* \* \* \* \*